(12) United States Patent
Ahmad et al.

(10) Patent No.: US 12,245,074 B2
(45) Date of Patent: Mar. 4, 2025

(54) METHODS AND APPARATUS DIRECTED TO NON-ACCESS STRATUM PROCEDURES IN CONNECTION WITH LAYER 2 RELAYING

(71) Applicant: INTERDIGITAL PATENT HOLDINGS, INC., Wilmington, DE (US)

(72) Inventors: Saad Ahmad, Montreal (CA); Behrouz Aghili, Commack, NY (US); Xiaoyan Shi, Westmount (CA); Samir Ferdi, Kirkland (CA); Michelle Perras, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/736,392

(22) Filed: Jun. 6, 2024

(65) Prior Publication Data

US 2024/0323754 A1   Sep. 26, 2024

Related U.S. Application Data

(63) Continuation of application No. 17/925,501, filed as application No. PCT/US2021/033603 on May 21, 2021.

(60) Provisional application No. 63/028,554, filed on May 21, 2020.

(51) Int. Cl.
*H04W 28/02* (2009.01)
*H04W 40/22* (2009.01)
*H04W 76/23* (2018.01)

(52) U.S. Cl.
CPC ....... *H04W 28/0289* (2013.01); *H04W 40/22* (2013.01); *H04W 76/23* (2018.02)

(58) Field of Classification Search
None
See application file for complete search history.

(56) References Cited

U.S. PATENT DOCUMENTS

| 2014/0341041 A1 | 11/2014 | Velev et al. |
| 2017/0019750 A1 | 1/2017 | Palanisamy et al. |

(Continued)

FOREIGN PATENT DOCUMENTS

| EP | 3047674 B1 | 7/2018 |
| EP | 3370473 A1 | 9/2018 |

(Continued)

OTHER PUBLICATIONS

Anonymous, "Technical Specification Group Services and System Aspects; System architecture for the 5G System (5GS)", 3rd Generation Partnership Project (3GPP), Stage 2; Release 16, Document: 3GPP TS 23.501 V16.4.0, Mar. 2020, 430 pages.

(Continued)

*Primary Examiner* — Kenny S Lin
(74) *Attorney, Agent, or Firm* — VOLPE KOENIG

(57) ABSTRACT

Methods and apparatuses directed to non-access stratum procedures in connection with layer 2 relaying are provided. A method implemented in a first WTRU, may comprise: receiving, from a second WTRU, a first sidelink transmission comprising a first information indicating an amount of time for the first WTRU to refrain from transmitting, to the second WTRU; determining to reselect to a third WTRU responsive to receiving the first information and based on a second sidelink transmission from the third WTRU; reselecting or autonomous reselecting to the third WTRU; establishing a connection with the third WTRU; and transmitting, to the third WTRU, a third sidelink transmission comprising a second information indicating congestion as a cause for the reselection.

16 Claims, 14 Drawing Sheets

(56) References Cited

U.S. PATENT DOCUMENTS

| | | |
|---|---|---|
| 2019/0394816 A1 | 12/2019 | Kim |
| 2020/0154440 A1 | 5/2020 | Gholmieh et al. |
| 2020/0178343 A1* | 6/2020 | Kim ............... H04W 76/27 |
| 2020/0196186 A1* | 6/2020 | Gupta ............ H04W 28/0289 |
| 2020/0260512 A1* | 8/2020 | Cheng ............ H04W 80/02 |
| 2021/0377789 A1* | 12/2021 | Catovic .......... H04W 76/10 |
| 2021/0410129 A1* | 12/2021 | Freda ............. H04W 72/543 |
| 2022/0061055 A1* | 2/2022 | Freda ............. H04W 72/1263 |
| 2022/0377613 A1* | 11/2022 | Watfa ............ H04W 48/06 |

FOREIGN PATENT DOCUMENTS

| | | | |
|---|---|---|---|
| WO | 2016073984 A2 | 5/2016 | |
| WO | WO-2018048642 A1 * | 3/2018 | ............ H04W 24/08 |
| WO | WO-2018063453 A1 * | 4/2018 | ............ H04L 47/12 |

OTHER PUBLICATIONS

Anonymous, "Technical Specification Group Services and System Aspects; Study on Cellular Internet of Things (CIoT) support and evolution for the 5G System (5GS)", Release 16, 3rd Generation Partnership Project (3GPP), Document: 3GPP TR 23.724 V16.1.0, Jun. 3, 2019, 274 pages.

Anonymous, "Technical Specification Group Services and System Aspects; Study on Architecture Enhancements to ProSe UE-to-Network Relay", Release 15, 3rd Generation Partnership Project (3GPP), Document: 3GPP TR 23.733 v.15.1.0, Dec. 2017, 81 pages.

Anonymous, Study on system enhancement for Proximity based Services (ProSe) in the 5G System (5GS), 3rd Generation Partnership Project (3GPP), Technical Specification Group Services and System Aspects, Document: TR 23.752 V0.3.0, Release 17, Jan. 2020, 73 pages.

* cited by examiner

EXAMPLE COMMUNICATIONS SYSTEM ARCHITECTURE SUPPORTING WTRU-TO-NETWORK RELAY

METHODS AND APPARATUS DIRECTED TO NON-ACCESS STRATUM PROCEDURES IN CONNECTION WITH LAYER 2 RELAYING

CROSS-REFERENCE TO RELATED APPLICATIONS

This application is a continuation of U.S. patent application Ser. No. 17/925,501, filed Nov. 15, 2022, which is the U.S. National Stage under 35 U.S.C. 371 of International Application No. PCT/US2021/033603, filed May 21, 2021, which claims the benefit of U.S. Provisional Application No. 63/028,554, filed May 21, 2020, all of which are incorporated by reference as if fully set forth.

BACKGROUND

This application is related to wired and/or wireless communications, including, for example, non-access stratum (NAS) procedures in connection with layer 2 relaying.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
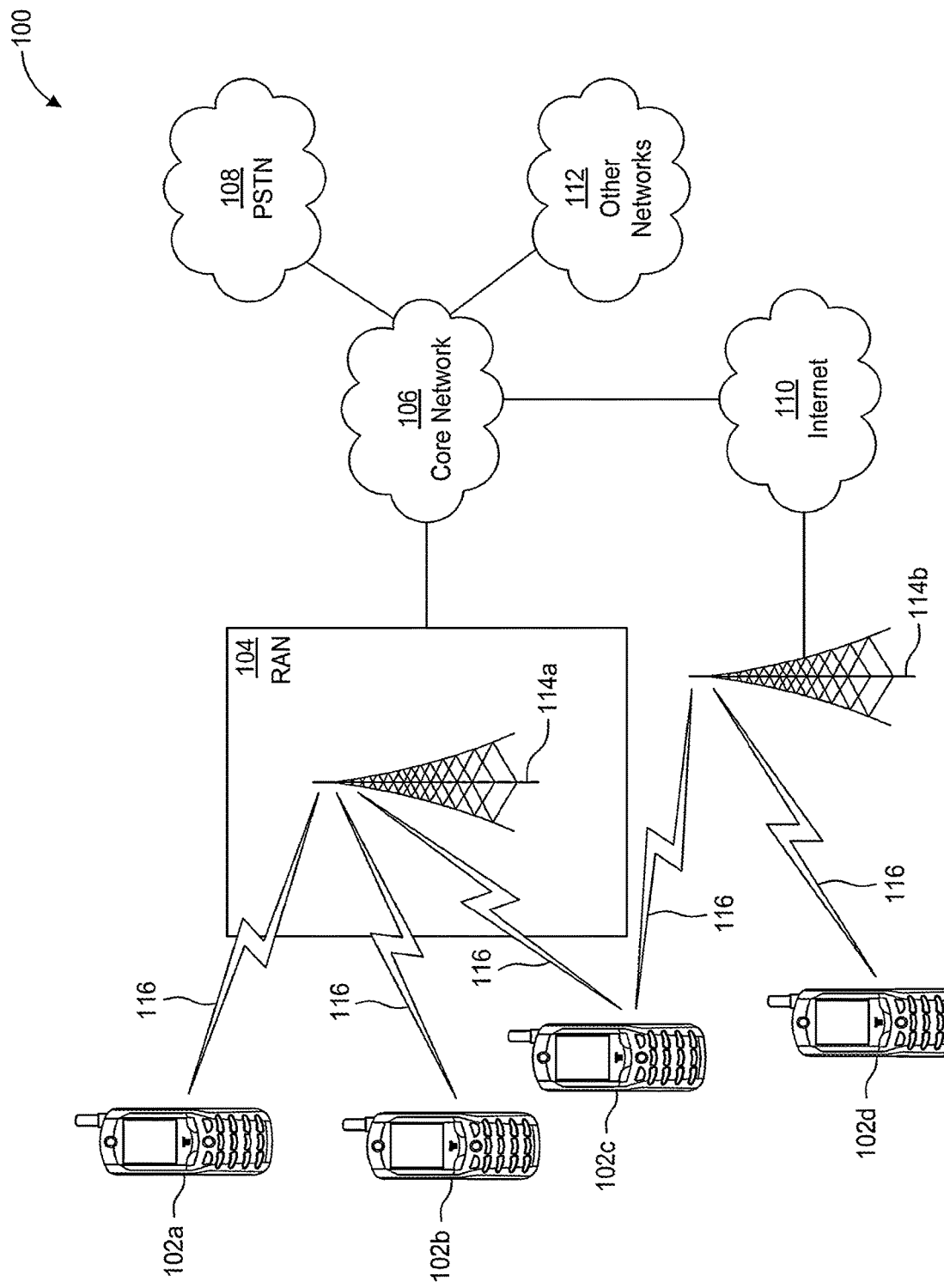
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
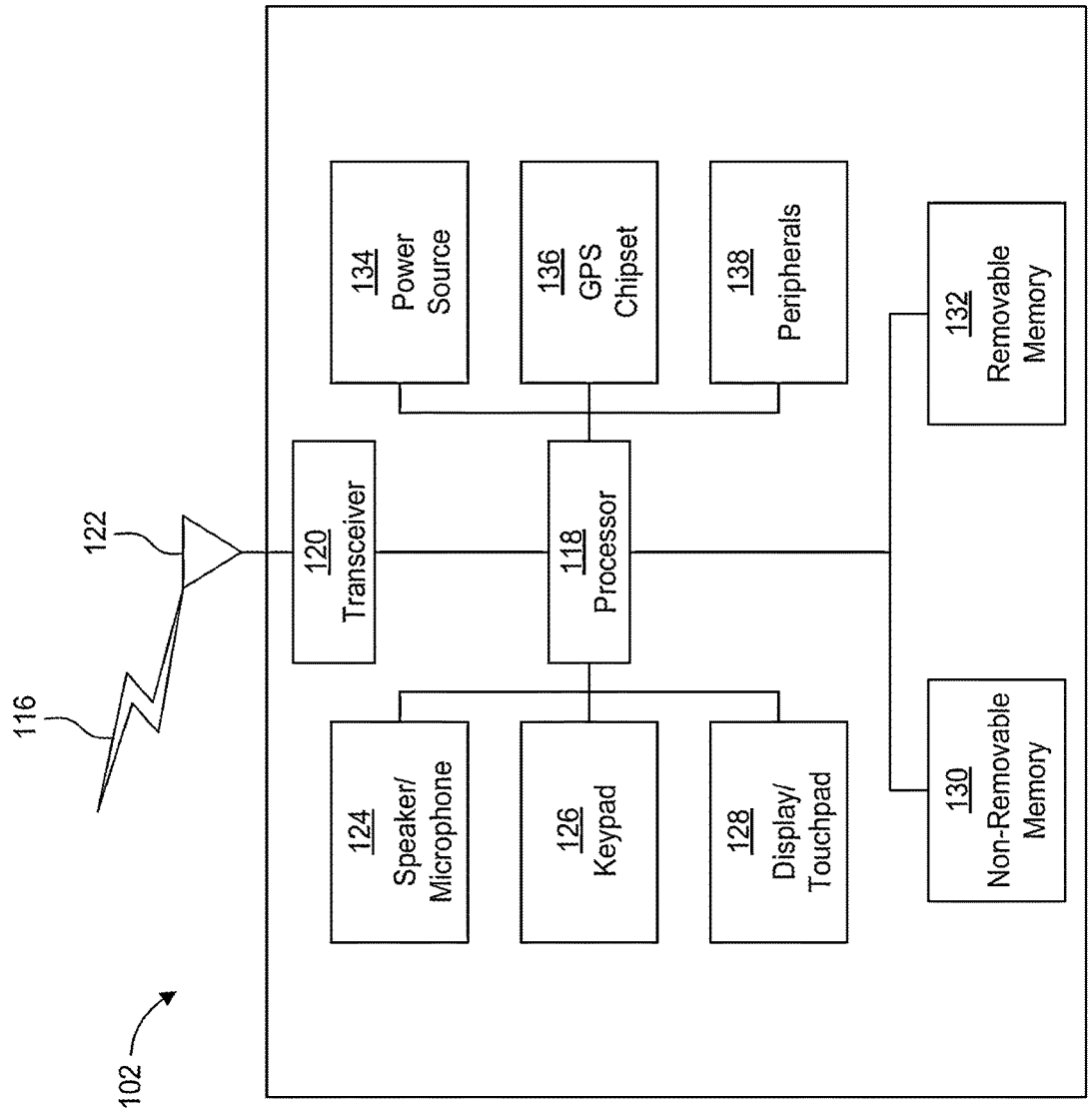
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
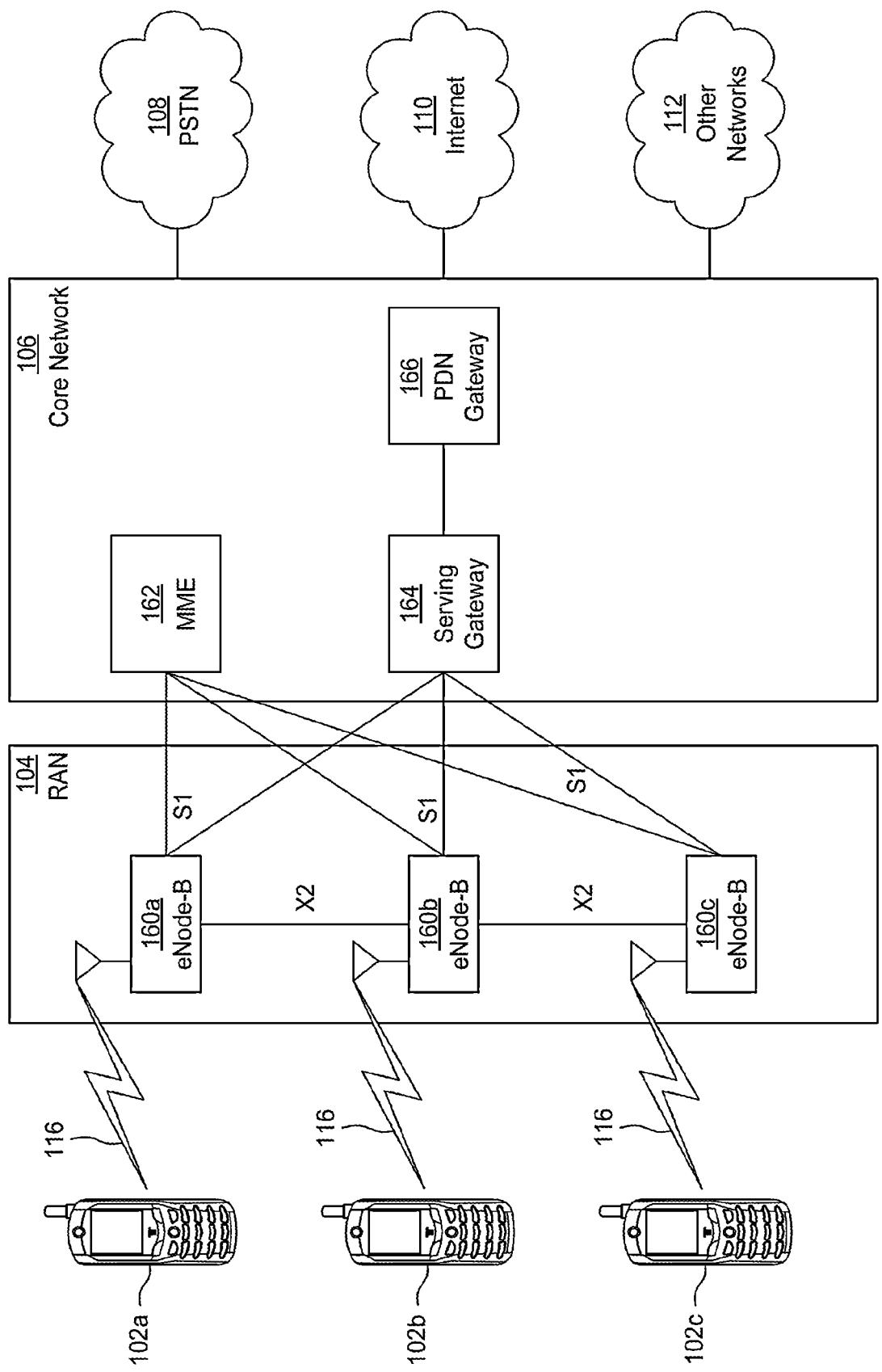
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging and/or mobile termination when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
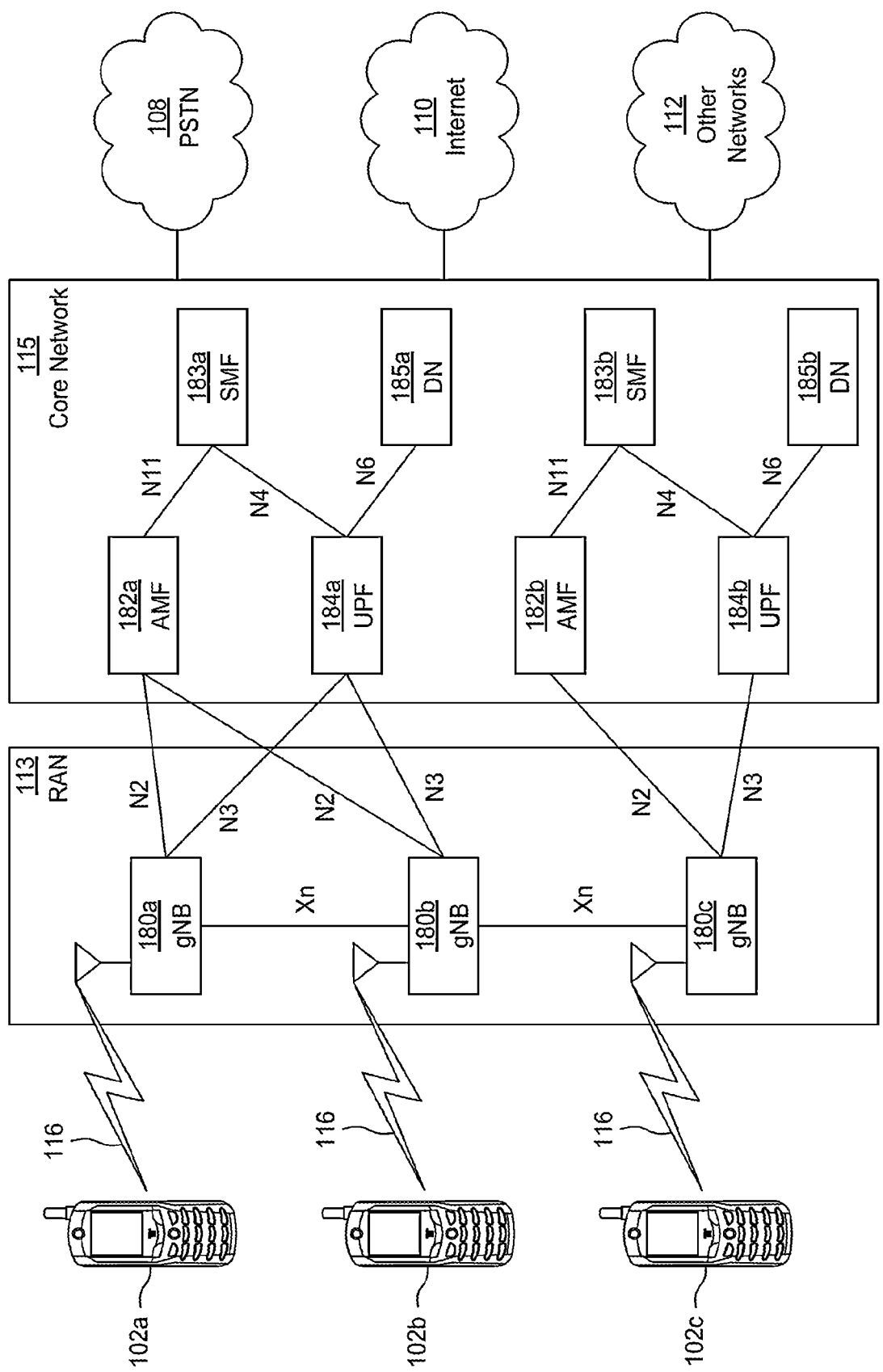
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. or example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 182a, 182b may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
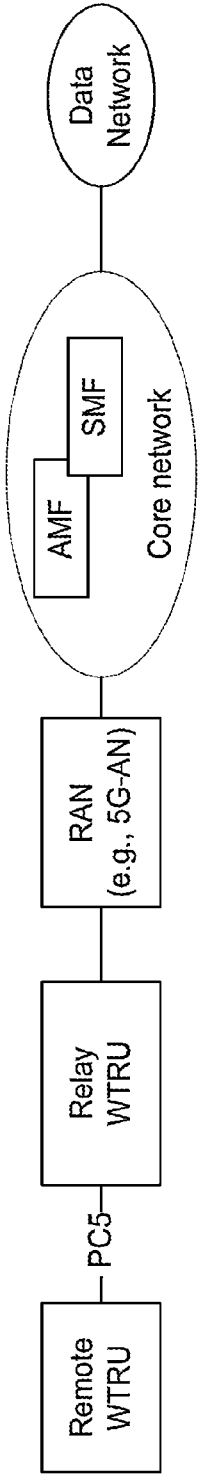
FIG. 2 is a block diagram illustrating an example of the communications system including a relay WTRU.

FIG. 2 is a block diagram illustrating an example of the communications system 100 including a relay WTRU 201. The relay WTRU 201 may be configured with, and may implement, relaying functionality to support connectivity and/or traffic relaying between the network and a WTRU 203. The WTRU 203 may be, for example, a WTRU 102 (FIG. 1) that may be out coverage of the RAN 113 and cannot communicate with the core network 115 directly or within coverage and uses a device-to-device (D2D) link (e.g., a sidelink) for communication. For ease of exposition, the terms "remote WTRU" may be used herein to refer to a WTRU (e.g., WTRU 203) that may be indirectly coupled to the network via a relay WTRU (e.g., relay WTRU 201).

The relay WTRU 201 may be a WTRU 102 (FIG. 1) in which the relaying functionality to support connectivity and/or traffic relaying is active (and assuming the WTRU 102 (FIG. 1) is configured with such functionality). Although not shown, the relay WTRU 201 may provide connectivity and/or traffic relaying between the network and more than one remote WTRU.

For simplicity of exposition, the relay WTRU 201 and the remote WTRU 203 are assumed to be configured in accordance with one or more protocols of proximity services (ProSe). ProSe are services that can be provided by the communications system based on a plurality of WTRUs being in proximity to each other.

Figure 3:
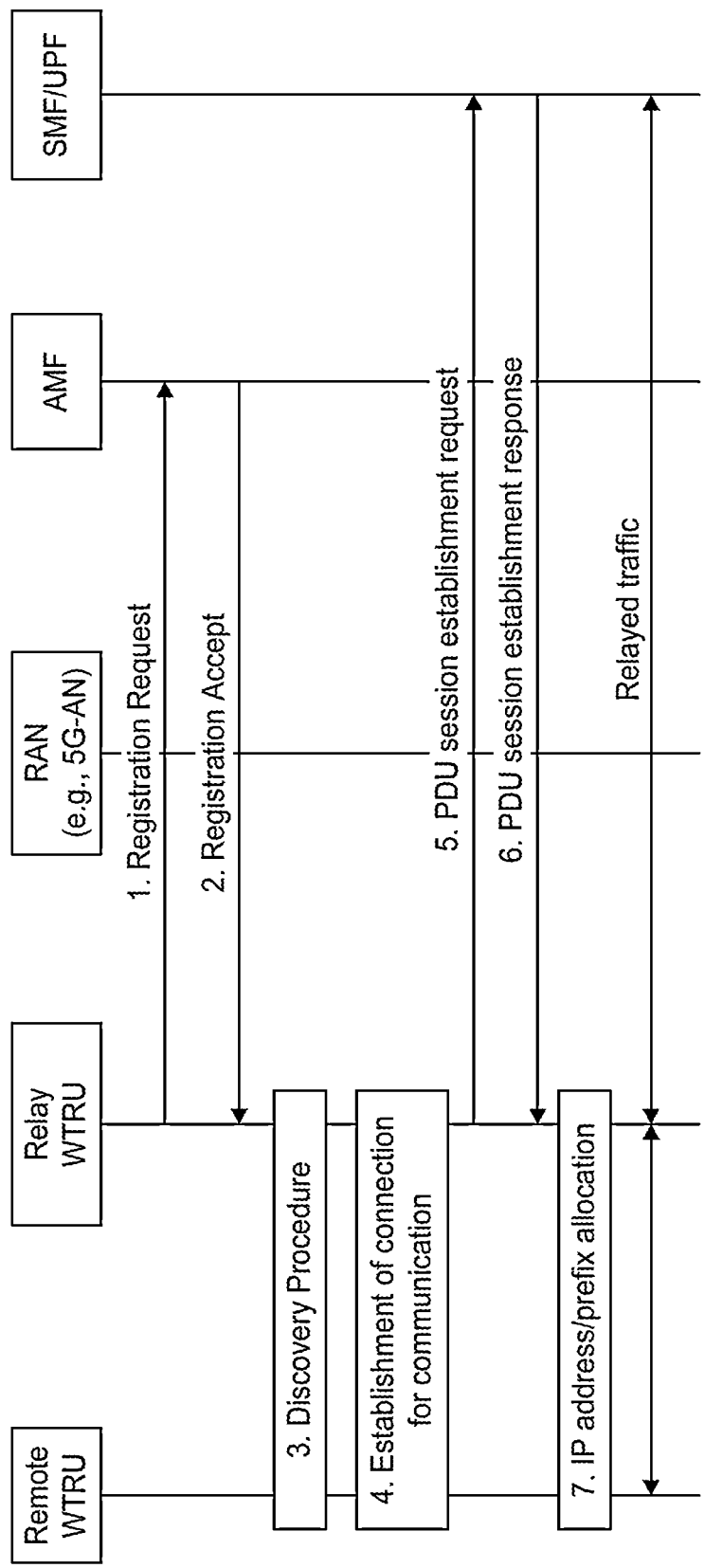
FIG. 3 illustrates an example relaying establishment procedure.

FIG. 3 illustrates an example relaying establishment procedure. For simplicity of exposition, the example relaying establishment procedure is described using the communications system 100 of FIG. 2 (and in turn FIG. 1). The example relaying establishment procedure may be carried out in other communications systems, as well.

According to the procedure, a relay WTRU 201 may register with an AMF 182a. The relay WTRU 201, for example, may send a registration request message to the AMF 182a (1) to request registration, and the AMF 182a may accept the registration and send a registration accept to the relay WTRU 201 (2) to indicate acceptance of the requested registration.

After registration, a remote WTRU 203 may perform discovery and select the relay WTRU 201 (3). The remote WTRU 203 may decide to perform discovery and/or select the relay WTRU 201, for example, if it is out of coverage of a RAN 113 and cannot communicate with the core network 115 directly and/or if it within coverage but decides to use a D2D link (e.g., PC5 link/sidelink) for communication. The remote WTRU 203 may establish a PC5 session with the relay WTRU 201 (4). The relay WTRU 201 may establish a PDU session (or PDN connection in EPC) for the remote WTRU 203 (5,6). After IP address/prefix allocation (7), traffic between the remote WTRU 203 and the network may be relayed by the relay WTRU 201.

The remote WTRU 203 may access the network via the relay WTRU 201. The terms "relay WTRU", "WTRU-to/from-network relay", "ProSe L2 WTRU-to/from-network relay", "ProSe L2 relay", and "WTRU-based relay" may be used interchangeably herein.

Figure 4:
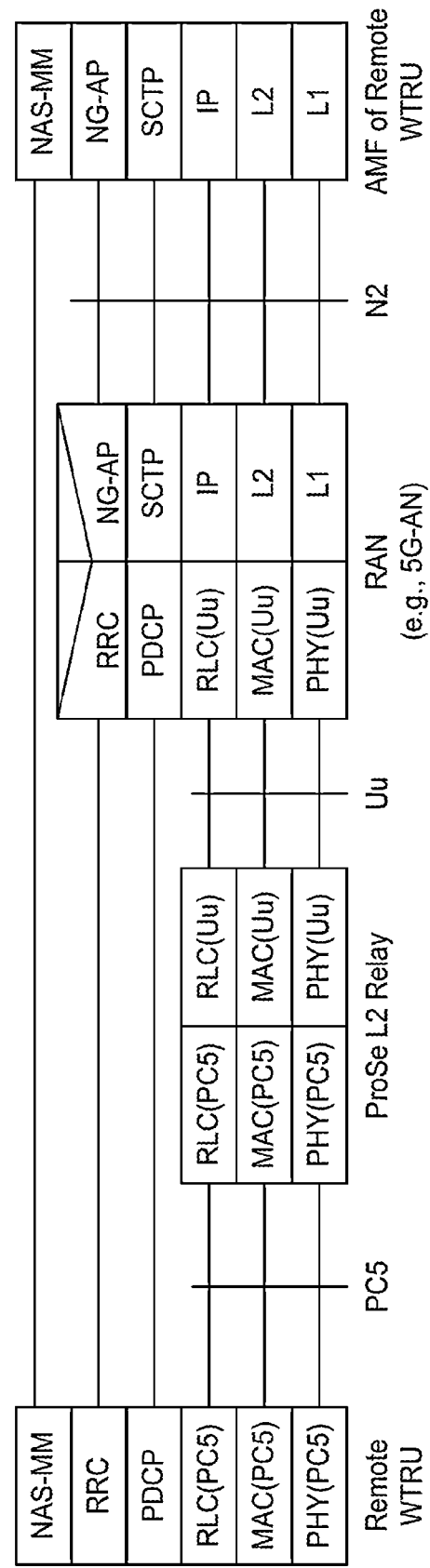
FIG. 4 illustrates example protocol stacks and interconnecting reference points that may be used with WTRU-based relaying.

FIG. 4 illustrates example protocol stacks and interconnecting reference points of a remote WTRU 203, a relay WTRU 201 (shown as "ProSe L2 Relay"), a RAN 113 (e.g., 5G-AN) and a AMF of the remote WTRU 203 ("remote-WTRU AMF 182a-1").

The remote WTRU 203 may be visible to the network with the relay WTRU 201 there between. The RAN 113 (e.g., 5G-AN) may terminate radio resource control (RRC) signalling and NG-AP signalling. The behaviour of the remote WTRU 203 with respect to functionality provided by, and/or protocols of, the remote-WTRU AMF 182a-1 may be the same to that of a WTRU directly coupled to the RAN 113 (e.g., 5G-AN). From the perspective at the RAN 113 (e.g., 5G-AN), the remote WTRU 203 may access it via the relay WTRU 201 and the RRC layer behaviour may be the same to that of a WTRU directly coupled to the RAN 113 (e.g., 5G-AN). Although not shown in FIG. 4, the relay WTRU 201 may select, be assigned and/or couple to the same AMF 182a-1 as the remote WTRU 203 or, alternatively, select, be assigned and/or couple to an AMF other than the AMF 182a-1. For ease of exposition, the terms "relay AMF" may be used herein to refer to an AMF that may be selected by, assigned to and/or coupled with a relay WTRU (e.g., relay WTRU 201).

NAS level congestion control may be initiated at any of a mobility management (MM) level and a session management (SM) level. The NAS level congestion control involves, among other things, (i) the network providing to a WTRU a value for a (e.g., configured) back-off timer and (ii) the WTRU backing off from or otherwise not initiating any NAS signalling until the back-off timer ("NAS back-off timer") expires or until the WTRU receives a mobile terminated (MT) request from the network.

The value of the NAS back-off timer provided at the MM level is generally sent by an associated AMF in a NAS reject message. As an example, when the AMF is congested and receives a NAS request (e.g. Registration or Service Request) message from the WTRU, the AMF may reject the request and may send a NAS reject message that includes a value for the NAS back off timer. The WTRU may receive the NAS back off timer value, initialize the NAS back off timer with the received value, start the NAS back-off timer, and refrain from initiating any NAS signalling (e.g., any NAS request), except possibly for initiating a deregistration procedure, until expiration of the NAS back-off timer or until the WTRU receives a MT request from the network and the like.

During registration (update), an AMF may disallow and/or deactivate mobile initiated connection only (MICO) mode for a WTRU if communication pattern parameters indicate uncertainty of downlink (DL) communications, or that DL communication is happening soon, e.g. within a preconfigured time window. The AMF may allow and/or activate the MICO mode in the other power saving cases.

For a WTRU in MICO mode, if the communication pattern parameters indicate the absence of DL communication, the AMF may allocate a large periodic registration timer value so that, the WTRU can enter deep sleep between periodic registration updates to save power. If the communication pattern parameters indicate scheduled DL communication, then the AMF should allocate a periodic registration timer value such that the WTRU may perform periodic registration update to renegotiate MICO mode before or at the scheduled DL communication time based on the expected WTRU behavior from the application server.

The AMF may provide a "do not reset the timer for Periodic Registration" indication to the WTRU together with the periodic registration timer value. If the "do not reset the timer for Periodic Registration" indication is provided by the AMF, then the WTRU may keep its periodic registration timer running while in CM-CONNECTED state. The WTRU may re-negotiate MICO mode and its parameters the periodic registration timer (e.g., by performing a periodic registration update) at or after expiration of the periodic registration timer. The periodic registration timer is only restarted on expiry. If the periodic registration timer value is renegotiated during a Registration procedure the periodic registration timer is stopped and restarted using the renegotiated value even when the "do not reset the timer for Periodic Registration" indication was provided by the AMF.

A core network may maintain a context for a remote WTRU connected via an relay WTRU in the same way as it would if the WTRU is connected directly to the network and has N1 interface with the AMF. The remote-WTRU AMF while interacting with the remote WTRU need not change its procedures and behavior since the remote WTRU may transmit messages via the relay WTRU.

A common scenario may be that a remote WTRU and the relay WTRU are attached/registered to different AMFs. Even if they are connected to the same AMF, the AMF may keep separate contexts for remote WTRU and the relay WTRU. The behavior of AMF for one the WTRUs may not consider that both signaling and traffic from one WTRU is being relayed by another WTRU. The AMF may apply the same behavior and procedure, e.g., NAS signaling to each of the WTRUs.

Application of similar procedures and NAS signaling for both the relay WTRU and the remote WTRU is a key benefit of L2 relaying. The network may have visibility and control over the remote WTRU because of transparent relaying of NAS signaling. The AMF behavior for a relay WTRU in certain scenarios may not take into consideration that there are remote WTRUs connected to relay WTRUs via PC5 (since they may be connected to different AMFs).

NAS level congestion and subsequently application of back off timers is one such scenario. It may be possible that relay-WTRU AMF is congested causing the AMF to send NAS back off timer (e.g. mobility management) to relay WTRU. Upon receiving the back off timer, the relay WTRU would not be able to initiate mobility management signaling until the expiry of the timer.

The remote WTRU may not be cognizant of such congestion situation at the relay WTRU. As part of the normal operation, the remote WTRU may send request to the relay WTRU (e.g. PC5 request). The relay WTRU may not be able to transition to connected mode (because of the mobility management back off timer) and may not be able to connect the remote WTRU to the network.

Under the scenario disclosed herein, the relay WTRU AMF congestion may cause service interruptions and connectivity issues for the remote WTRU. Various embodiments disclosures herein address the L2 relay WTRU behavior with respect to experiencing network congestion (e.g., receiving a value for a back off timer from its AMF and having a pending request to relay data from the remote WTRU.

There are cases in which the RAN may be experiencing an overload or congestion scenario. As an example, it could be the case where the CN, e.g., the AMF, is congested. In that case, the CN may inform RAN to start a overload control mechanism by sending a message with the overload indication. When the RAN (i.e. a gNB in the case of 5G NW) receives this indication, it may apply it toward the WTRUs that want to access the network. As an example, when a WTRU tries to access the network by means of requesting to establish an RRC Connection, the RAN may reject it and also provide an extended wait time (EWT) to the WTRU. The reception of the EWT may trigger the RRC layer of the WTRU to indicate it to the NAS layer and the NAS layer may apply the back-off mechanism (e.g., by means of starting a MM-level back-off timer with the same value as the received EWT. The Relay WTRU that receives the EWT form RAN and not the remote WTRU, may need to contact the NW. Various embodiments disclosures herein address the behavior of the relay WTRU in connection with receiving the EWT from RAN, how the relay WTRU may communicate with the remote WTRU and what action(s) should the remote WTRU take.

There are scenarios in which the WTRU may not reset its periodic timer when it transitions to connected mode before the expiry of the timer. The network may keep track of intervals when the WTRU exits sleep mode, e.g., idle mode/eDRX MICO or PSM. Such tracking may enable the network to schedule delivery of MT data at these time intervals. The network may inform (e.g., also inform) the application server that the WTRU may be available at these times for the application server to be able schedule data if it has any at those times.

The remote WTRU (e.g., an IoT type remote WTRU) in some scenario might want to use the 'Scheduled Delivery of MT Data' feature. Enabling this feature in L2 relaying may increase complexity since idle mode behavior of the relay WTRU may need to be taken into consideration to determine the MT data delivery time schedules. The idle mode intervals or periodic timer of the relay WTRU may not be in synch with the times when the remote WTRU performs period registration.

Additional behavior may be needed at both the remote WTRU and the relay WTRU to enable (e.g., seamlessly enable) the 'Scheduled Delivery of MT Data' feature at the remote WTRU. Various embodiments disclosures herein address how to enable receiving schedule MT data when the remote WTRU has a long period of inactivity (e.g. in eDRX, MICO, PSM, etc.).

Mobility restrictions may restrict mobility handling or service access of a WTRU. Mobility restrictions may include RAT restriction, Forbidden Area, Service Area Restrictions, Core Network type restriction and Closed Access Group information. Mobility restrictions are decided by the Core Network.

With mobility restrictions, the WTRU may be restricted from initiating any communication with the network for this PLMN (in Forbidden Area), or initiating a service request or SM signalling (in Non-Allowed Area), etc.

Since the network may provide different mobility restrictions to the remote WTRU and L2 Relay WTRU, various embodiments disclosures herein address L2 relay WTRU behavior when it moves to an area with mobility restrictions, e.g. Forbidden Area or Non-allowed area, and it receives a pending request to relay data/signaling from a remote WTRU.

Procedures, methods, architectures, apparatuses, systems, devices, and computer program products directed to non-access stratum procedures in connection with layer 2 relaying are disclosed herein. Among such apparatuses is a relay WTRU that is experiencing, expected to experience and/or informed of upstream congestion (e.g. NAS level congestion) may inform a remote WTRU of such congestion in various ways and may take various actions and/or cause various actions to be taken to bar or otherwise limit UL and/or DL relaying operation and/or override congestion control mechanisms to allow any of UL and DL relaying operation. For example, the relay WTRU may take various actions to inhibit the remote WTRU, and/or to cause the remote WTRU to refrain, from communicating with the relay WTRU for a time period. That time period may be for all, some or more than the time during which the relay WTRU is experiencing and/or expected to experience congestion. The time period may be based on one or more signaled values, set initially to one value (e.g., a fixed value, infinity, etc.) and then adjusted up or down with another value, etc.

The relay WTRU, for example, may use a procedure for disconnecting an ongoing PC5 link between peer WTRUs to inform the remote WTRU of the congestion and/or to inhibit the remote WTRU, and/or cause the remote WTRU to refrain, from communicating with the relay WTRU indefinitely or for some other time period. After the relay WTRU receives a NAS message (e.g. NAS reject message) with a value for a NAS back off timer, the relay WTRU may proceed by releasing its ongoing unicast PC5 connections with the remote WTRU (and/or some or all of any other ongoing unicast PC5 connections). The relay WTRU may, as part of the link release procedure, inform the remote WTRUs whose connections are being released of the cause for the release, for example, using a specific cause code that indicates the cause for link release is that the relay WTRU experiencing, expected to experience and/or has been informed of upstream congestion (e.g. NAS level congestion). The relay WTRU may, as part of the link release procedure, inform the remote WTRUs that it may not be able to accept new PC5 connections for a time period. The remote WTRUs may use this information to refrain from initiating a PC5 connection (or otherwise communicating via the PC5 with) the relay WTRU for the duration of such period. As an example, the remote WTRUs may be configured with a PC5 back-off timer and configured to refrain from initiating a PC5 connection (or otherwise communicating via the PC5 with) the relay WTRU until expiration of the PC back-off timer. The relay WTRU may provide to the remote WTRUs values for their respective PC5 back off timers. After receipt of such values, the remote WTRUs may refrain (and/or be inhibited) from communicating with the relay WTRU until expiration of their respective timers. The PC5 back off timer values may be based on the NAS back off timer value. For example, the PC5 back off timer values provided during the link release procedure may be set as an offset of the NAS back off timer values received by the relay WTRU. The relay WTRU may otherwise derive the PC5 back off timer values from the received NAS back off time value.

The relay WTRU may decide to initiate the release procedure with a remote WTRU if (e.g., only if) the remote WTRU has data to be sent and no DL data is expected to be received and/or the remote WTRU is not in an idle state. For example, the relay WTRU may refrain from using the link release procedure for remote WTRUs (e.g., remote WTRUs in MICO mode) that only send data at specific intervals, and such interval does not occur during the time corresponding to the NAS back-off timer and/or the time during which the relay WTRU is experiencing, expected to experience and/or informed of upstream congestion.

The relay WTRU may select the ongoing PC5 connections to be released based on various criteria, e.g. level of activity (sending/receiving data), QoS, service type, etc.).

Figure 5:
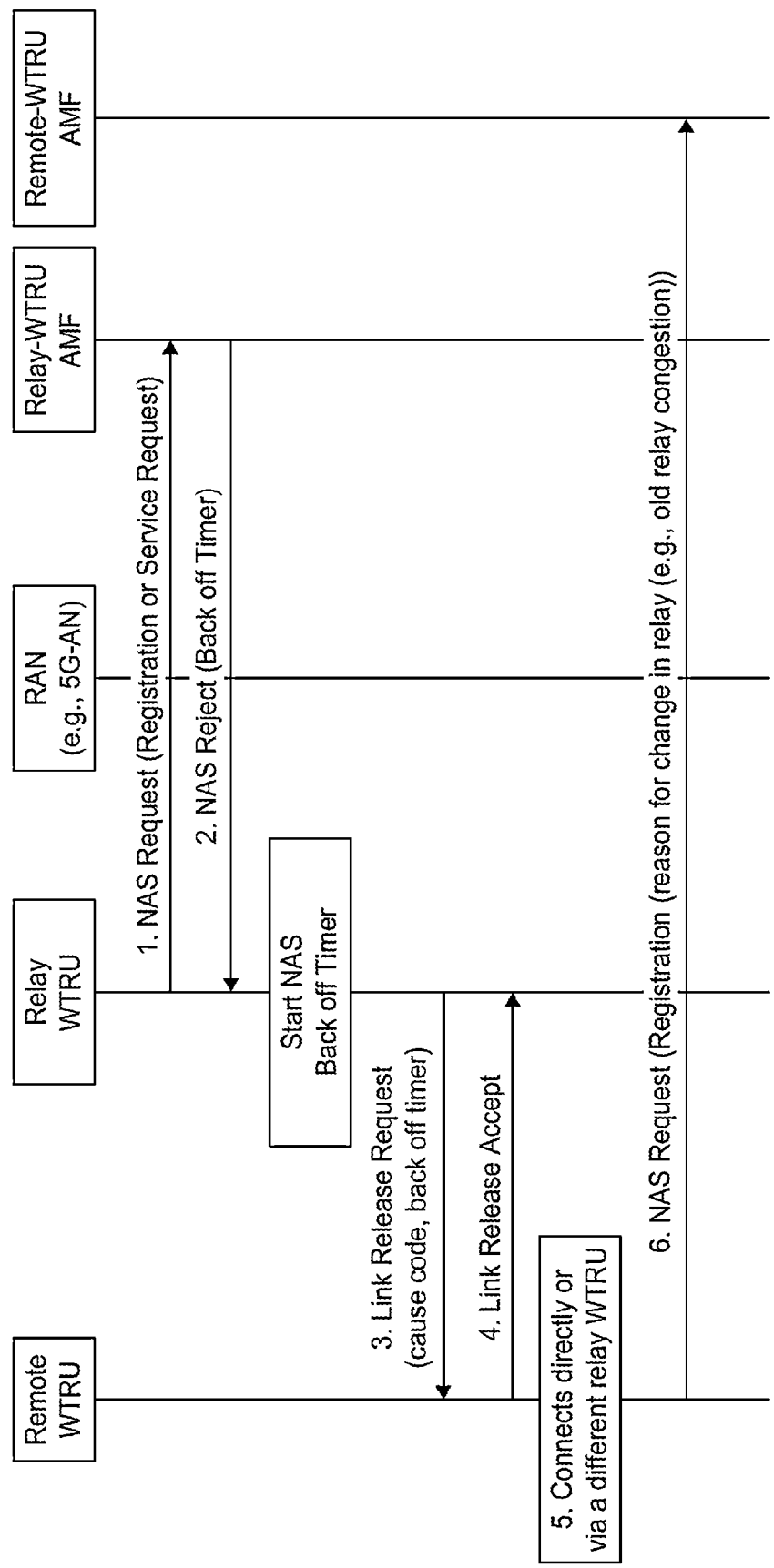
FIG. 5 is a message flow diagram illustrating an example link release procedure in accordance with various embodiments.

FIG. 5 is a message flow diagram illustrating an example link release procedure in accordance with various embodiments. For simplicity of exposition, the example link release procedure is described using the communications system 100 of FIG. 2 (and in turn FIG. 1). The example link release procedure may be carried out in other communications systems, as well.

The relay WTRU may send, to the relay-WTRU AMF, a NAS request (e.g., a registration request or service request) message to transition from idle mode to connected mode (1). The relay-WTRU AMF may receive the NAS request at a time in which the it is congested and may decide to reject the NAS request.

Based such decision, the relay-WTRU AMF may send a NAS reject message to the relay WTRU. The NAS reject message may include a value for a NAS back off timer (2). After receipt of the NAS reject message, the relay WTRU may start its NAS back-off timer using (or based on) the received value and may initiates the link release procedure with the remote WTRU. The relay WTRU may send a link release request PC5 message (3) as part of the link release procedure. The link release request PC5 message may include (i) a specific cause code for indicating the cause for link release is that the relay WTRU experiencing, expected to experience and/or has been informed of upstream congestion, and (ii) a value for a PC5 back off timer. The remote WTRU may receive the link release request PC5 message, and a consequence, the remote WTRU becomes aware of the congestion situation at the relay WTRU. The cause code, for example, indicates the AMF/NAS congestion experienced by the relay WTRU, and the value for PC5 back off timer informs the remote WTRU of a duration of time for which the relay WTRU may not be able to accept new PC5 requests.

The remote WTRU may respond to the link release request PC5 message by sending to the relay WTRU a link release accept message (4). The remote WTRU may perform one or more of the following actions after receiving link release request PC5 message:

- The remote WTRU may add an identifier of the relay WTRU ("relay WTRU id"), such as a ProSe relay ID, user info, discovery code etc., to a list of unavailable relay WTRUs that is maintained at the remote WTRU. A timer (e.g. the received PC5 back off timer) may be associated with the added entry in the list. The relay WTRU id may be removed from this list upon expiry of the timer or upon reception of an indication from the Relay WTRU indicating its availability. The timer associated to the relay WTRU id may be restarted or otherwise adjusted before expiration if the remote WTRU receives from the relay WTRU (i) a subsequent indication indicating that congestion is still being experienced and/or (ii) a back-off timer.
- The remote WTRU may connect to the network via a different path, for example, directly via a RAN or via a different relay WTRU (5). For example, the remote WTRU may discover another relay WTRU to establish the relay connection, where the discovery and/or the connection establishment procedure at the remote WTRU may take into consideration the relay WTRUs which are part of the unavailable relay WTRUs list. The remote WTRU, for example, may check the unavailable list before triggering the establishment of a new PC5 relay connection. If the relay WTRU id of a concerned relay WTRU is listed on the list, the remote WTRU may attempt to discover another relay WTRU providing the same service (relaying for the same service) that is not listed on the unavailable list.
- In the case where the remote WTRU may be within the network coverage, reception of the link release request PC5 message from the relay WTRU may trigger the remote WTRU to perform a service continuity procedure to connect directly via the Uu interface. The remote WTRU may use the direct connection until the expiry of the timer or until it finds another suitable relay WTRU.

After connecting via the different path, the remote WTRU may inform the network (e.g. remote WTRU AMF) of the reason for change in connection/relaying path (6) (i.e., congestion at the previous relay WTRU). The remote WTRU may inform the network using an indication, and the indication may be sent as part of registration update (e.g., registration request message) or a different NAS message. The indication may inform (e.g., also inform) the remote WTRU AMF that there is a possibility for the WTRU to go back to the previous relay WTRU after the back off timer expires.

In various embodiments, when a relay WTRU receives the NAS back off timer from its corresponding relay-WTRU AMF, the relay WTRU may inform the remote WTRU of the congestion and the remote WTRU may refrain from initiating a PC5 connection (or otherwise communicating via the PC5 with) the relay WTRU based on such information.

The relay WTRU, for example, may provide an indication of (or otherwise indicate) the congestion in a next keep alive (or other type) PC5 message and/or one or more subsequent keep alive (or other type) PC5 messages. An explicit congestion indication may be included with a signaled value of the PC5 back off timer (which value may possibly be based on (e.g., derived from) a signaled value NAS back off timer). The relay WTRU may implicitly indicate the relay WTRU congestion to the remote WTRU by excluding a value for the PC5 back off timer in the keep alive message(s). The relay WTRU may indicate the that the relay WTRU is no longer experiencing congestion by excluding the indication and/or a value for the PC5 back off timer in the keep alive message(s) after having sent the indication and/or value in one or more previous keep alive (or other type) PC5 messages.

In various embodiments, the relay WTRU may send the back off indication and/or value for the PC5 back off timer when it receives (e.g., responsive to receiving) a mobile originated (MO) request from the remote WTRU to relay data or signaling message.

In various embodiments, the relay WTRU may initiate a link modification procedure (e.g., with an indication) to pause the link or temporarily move to the dormant state. The link modification PC5 message may include a value for a timer for the duration of the dormant period. In an embodiment, the relay WTRU may initiate another link modification procedure when the congestion has abated (e.g., prior to expiration of a PC back-off timer) to indicate to the remote WTRU that it may resume the service and come out of the dormant state.

In various embodiments, the relay WTRU may cause the remote WTRU to cancel the PC5 back off timer. The relay WTRU, for example, may cause the cancelation of the PC5 back off timer based on (e.g., responsive to) receiving a paging message or a mobile terminated (MT) request from the relay-WTRU AMF. In various embodiments, the relay WTRU may initiate the cancelation procedure by sending a "cancel back off" indication to the remote WTRU, e.g., in the keep alive message and/or another PC5-S message, such as a link modification request. The remote WTRU may receive the "cancel back off" indication, and may reset the PC5 back off timer (e.g., set the value to zero) and, in turn, allow the remote WTRU to resume service and/or come out of dormant state.

When the remote WTRU receives the back off timer in the keep alive message, the remote WTRU may refrain from sending to the relay WTRU any messages (NAS signaling and/or data) to be relayed. The remote WTRU may transmit PC5 signaling messages to the relay WTRU if the back off timer is running or not.

While the PC5 back off timer is running, the remote WTRU may perform one or more of the following actions (e.g., in addition to any of the remote WTRU behaviors disclosed above in connection with the link release procedure):

The remote WTRU may decide to preserve its connection with the current relay WTRU and stay inactive for a time period, e.g., until the congestion is resolved.

The remote WTRU may initiate a link release procedure or initiate a service continuity procedure to change the relay path either to direct Uu path or via another relay WTRU.

The remote WTRU may send (e.g., only send) selective MO signaling messages to the relay WTRU for relaying purposes, e.g., if the remote WTRU is connected to the same relay WTRU while the PC5 back off timer is running. Registration messages related to periodic registration procedure may be one example of messages sent to the relay WTRU for relaying. A new indication may be sent on the PC5 message informing the relay WTRU about the type of MO signaling message. Such indication may be used by the relay WTRU to override the NAS back off timer and proceed with the service request with a high priority cause to transition to connected mode. Once in connected mode, the relay WTRU would be able to relay the registration message for periodic registration.

The remote WTRU may move the link to the dormant state. V2X services in the dormant state may be paused temporarily at the remote WTRU.

In various embodiments, the congestion associated with relay-WTRU AMF may allow the relay WTRU to transmit signaling messages and data for the remote WTRU (e.g., when served by an AMF other than the relay-WTRU AMF). When the AMF sends the back off timer to the relay WTRU, additional (new) information associated to the back off timer may be sent to the relay WTRU in the NAS reject message (e.g. service reject or registration reject). The corresponding information may indicate to the relay WTRU whether the NAS back off timer is applicable to remote WTRU connections (e.g., some or all remote WTRU connections. Examples of the additional information associated with the NAS back off timer may include any of:

information indicating whether the NAS back off timer is applicable to all or some MO/NAS requests (emergency scenario may be excluded);

information indicating whether the NAS back off timer is applicable to relay WTRU MO/NAS requests (e.g., relay WTRU serving AMF may be congested while remote WTRU may not be); and different back off timers for relay WTRU requests and remote WTRU requests.

If the additional information associated with the NAS back off timer suggests that the received value for the NAS back off timer is (e.g., is only) applicable to relay-WTRU mobile originated (MO) requests, then the relay WTRU need not inform the remote WTRU about relay-WTRU AMF congestion. When sending a service request or registration message, the relay WTRU may inform the relay WTRU AMF by including a new indication ("relaying indication") in the NAS message specifying that the current registration request or service request has been initiated based on MO request from the remote WTRU. The relaying indication may be included as part of new establishment cause at the RRC or NAS level.

Figure 6:
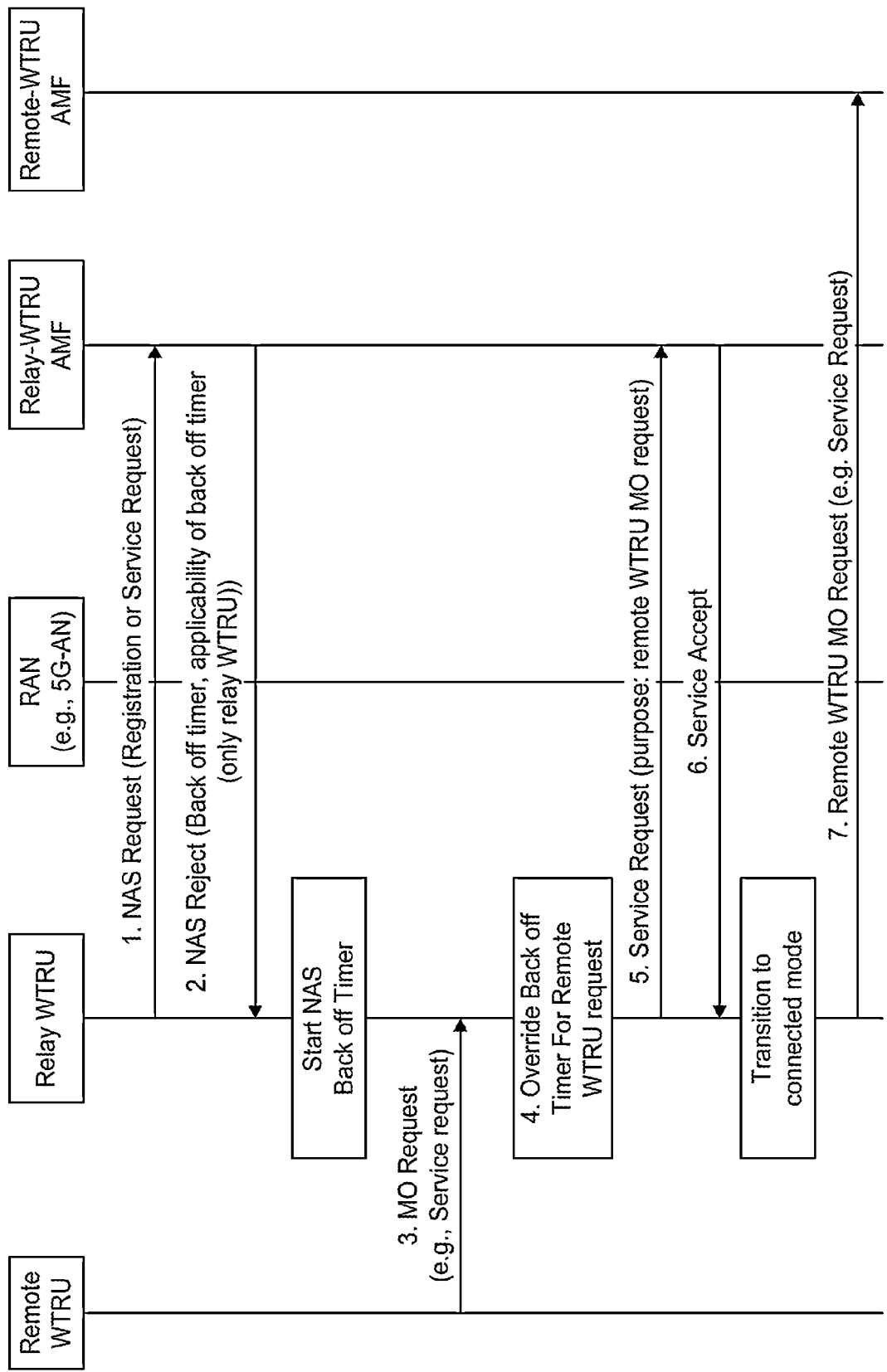
FIG. 6 is a message flow diagram illustrating an example congestion control override procedure in accordance with various embodiments.

FIG. 6 is a message flow diagram illustrating an example congestion control override procedure in accordance with various embodiments. For simplicity of exposition, the congestion control override procedure is described using the communications system 100 of FIG. 2 (and in turn FIG. 1). The example congestion control override procedure may be carried out in other communications systems, as well.

The relay WTRU may send to the relay-WTRU AMF a NAS request (e.g., a registration request or a service request) to transition out of idle state (1). The relay-WTRU AMF may receive and reject the NAS request due to relay-WTRU network congestion. The relay-WTRU AMF may send a NAS reject message to the relay WTRU (2). The NAS reject message may include a value for the NAS back off timer and information indicating the applicability of the back off timer (e.g. information indicating that NAS back off is only applicable to relay WTRU requests). The relay WTRU may receive the NAS reject message, initialize the NAS back off timer using the received value, and start the NAS back off timer.

The relay WTRU may receive a MO request (e.g. a service request) from the remote WTRU (3). This may occur, for example, if the remote WTRU tries to transition to connected mode.

Based on a characteristic of the received back off timer (e.g., the additional information associated with the NAS back off timer), the relay WTRU may decides to relay the MO request from the remote WTRU (4). For example, if the remote WTRU and relay WTRU are served by different AMFs, then the relay WTRU may determine to relay the remote WTRU request if the back-off timer additional information indicates that remote WTRU requests are allowed (if served by a different AMF). The relay WTRU may determine the remote WTRU AMF identity based on a remote WTRU temporary identity (e.g., a GUTI).

The relay WTRU may send the service request message to the relay-WTRU AMF (5). The service request message may include a new indication informing the relay-WTRU AMF that the request to establish NAS signaling is due (e.g., responsive) to an MO request from the remote WTRU.

Based on the new indication, the relay WTRU AMF may accept the request and send a service accept message (6). The MO request (e.g. service request) may be relayed to the remote-WTRU AMF by the relay WTRU (7).

After receiving a NAS reject message, the relay WTRU may make itself unavailable for direct discovery for the duration of the back off timer (e.g. stop transmission of broadcast discovery messages or stop monitoring/replying to direct discovery request messages). The relay WTRU may resume normal discovery operations (e.g. resume transmission of broadcast discovery messages or resume monitoring/replying to direct discovery request messages) when the NAS congestion condition is abated (e.g. when back off timer expires and a following NAS request is accepted).

The relay WTRU may also reject new direct connection requests received while the back off timer is still running. The reject message may include a specific cause code indicating that the link establishment request is rejected due to relay-WTRU being under NAS level congestion conditions. The reject message may include (e.g., also include) a value for the back off timer indicating to the remote WTRU that the relay WTRU may not be able to accept new PC5 connections for the duration of the timer. The relay WTRU may derive this PC5 back off timer value from the received NAS back off value, e.g., as an offset or multiplier of the NAS back off timer value or back off timer remaining running time. The remote WTRU may re-attempt connecting with the relay WTRU upon that timer expiry.

Alternatively, the relay WTRU may discard new direct connection requests received while the back off timer is still running. In that scenario, the remote WTRU may retransmit new direct connection request(s) based on conventional retransmission timer.

In various embodiments, the discovery mechanism may still be run. and an unavailable indication and/or an expected available time (or back-off timer) may added to the advertisements to let the listening WTRUs know about the relay-WTRU current congestion situation and duration. Remote WTRUs may try to connect with the relay WTRU once available expected time is reached.

A relay WTRU experiencing congestion and which has the capability of sending data to the network, e.g. as herein, or for specific service types, may decide to not advertise its congestion level or to advertise it with an added indication about which traffic is allowed to be relayed.

In various embodiments, the relay UE, upon attempting to establish an RRC connection with the RAN and receiving value for an extended wait time (EWT) in a reject or release message, may inform the remote WTRU of the congestion/overload situation in RAN and also pass the value of the EWT to the remote WTRU. This may be carried out by e.g. sending a PC5 message to the remote WTRU, for instance. The choice of the PC5 message may depend on the condition of the PC5 link between the two UEs. As an example, where a PC5 link already exists and the link is supervised by the two UEs, keep alive messages can be used. Alternatively, where no link exists and/or is running at this point, the relay WTRU may broadcast an indication in a discovery message to inform interested remote-WTRU that that the relay WTRU is experiencing RAN level congestion. Alternatively, the relay WTRU may inform the remote WTRU about the status of the RAN while accepting a unicast communication establishment from the remote WTRU. The remote WTRU may apply the EWT as a NAS back-off timer. In addition, where the remote WTRU is in either PSM or MICO mode, it may go back to PSM/MICO immediately or without further delay (e.g., to avoid waiting for the network to allocate an active time).

The "do not reset the timer for Periodic Registration" timer feature may be enabled by the remote WTRU AMF if the remote WTRU requests enablement of power saving e.g. MICO in the registration message. The remote-WTRU AMF may send this indication to the remote WTRU in a registration accept message. Coordination between the remote WTRU and the relay WTRU may be needed so that idle mode operation of the relay WTRU does not disrupt a scheduled wake up time of the remote WTRU.

The remote WTRU, for example, may inform the relay WTRU about the activation of "do not reset the timer for Periodic Registration" feature when the remote WTRU receives such indication in the registration accept message from the AMF. The remote WTRU may send (e.g., also send) its periodic update timer value to the relay WTRU. The remote WTRU may send this information to the relay WTRU via PC5 Signaling message, for example, direct communication request or link modification request. The information about activation of "do not reset the timer for Periodic Registration" feature may be sent by the remote WTRU, e.g., when the remote WTRU transitions to idle mode.

The remote WTRU may inform the relay WTRU when it moves from connected mode to idle mode (e.g., a monitor request). Part of the messaging may be to inform this state change to the relay WTRU. The remote WTRU may add new information elements in the message to indicate that remote WTRU would not be resetting the periodic timer in the event of MO request, and may send the corresponding periodic timer to the relay WTRU.

After receiving the information about the "do not reset the timer for Periodic Registration" feature activated at the remote WTRU, the relay WTRU may adapt certain behavior to facilitate the scheduled wake up times for the remote WTRU. The relay WTRU may take any of the following actions:

- The relay WTRU may send a PC5 signaling response message to the remote WTRU. The response may be, for example, a direct communication request or a link modification request, and may act as a confirmation that the relay may assist the remote WTRU in maintaining its scheduled wake up times.
- The relay WTRU may use the received information as an input to configure its idle mode behavior. The relay WTRU may update its idle mode/power saving parameters, e.g., request a new periodic timer from the AMF. The relay WTRU may further request the AMF to disable its power saving mode (e.g. MICO) if enabled. The relay WTRU may perform a registration procedure to request new idle mode parameters from the network (i.e. relay-WTRU AMF).
- The relay WTRU may inform (e.g., also inform) the AMF (relay-WTRU AMF) that there is ongoing PC5 connection with a remote WTRU with the "do not reset the timer for Periodic Registration" enabled. The value of the periodic timer received from the remote WTRU may be passed on the relay-WTRU AMF. Such indication and the value of the associated periodic timer may enable the AMF to determine the relay WTRU periodic timer and idle mode behavior. For example, the relay-WTRU AMF may use this new information to set the DRX parameters, active time and periodic timer etc. for the remote WTRU.

In various embodiments, the relay WTRU might not be able to accept the request from the remote WTRU to assist in performing scheduled wake up. One such case may be when there are multiple remote WTRUs connected to the relay WTRU asking to enable the "do not reset the timer for Periodic Registration". In such a case, the relay WTRU may send a response to the remote WTRU informing it of the inability to grant the request. The remote WTRU as a result may perform a registration procedure to disable the scheduled MT data delivery feature.

Figure 7:
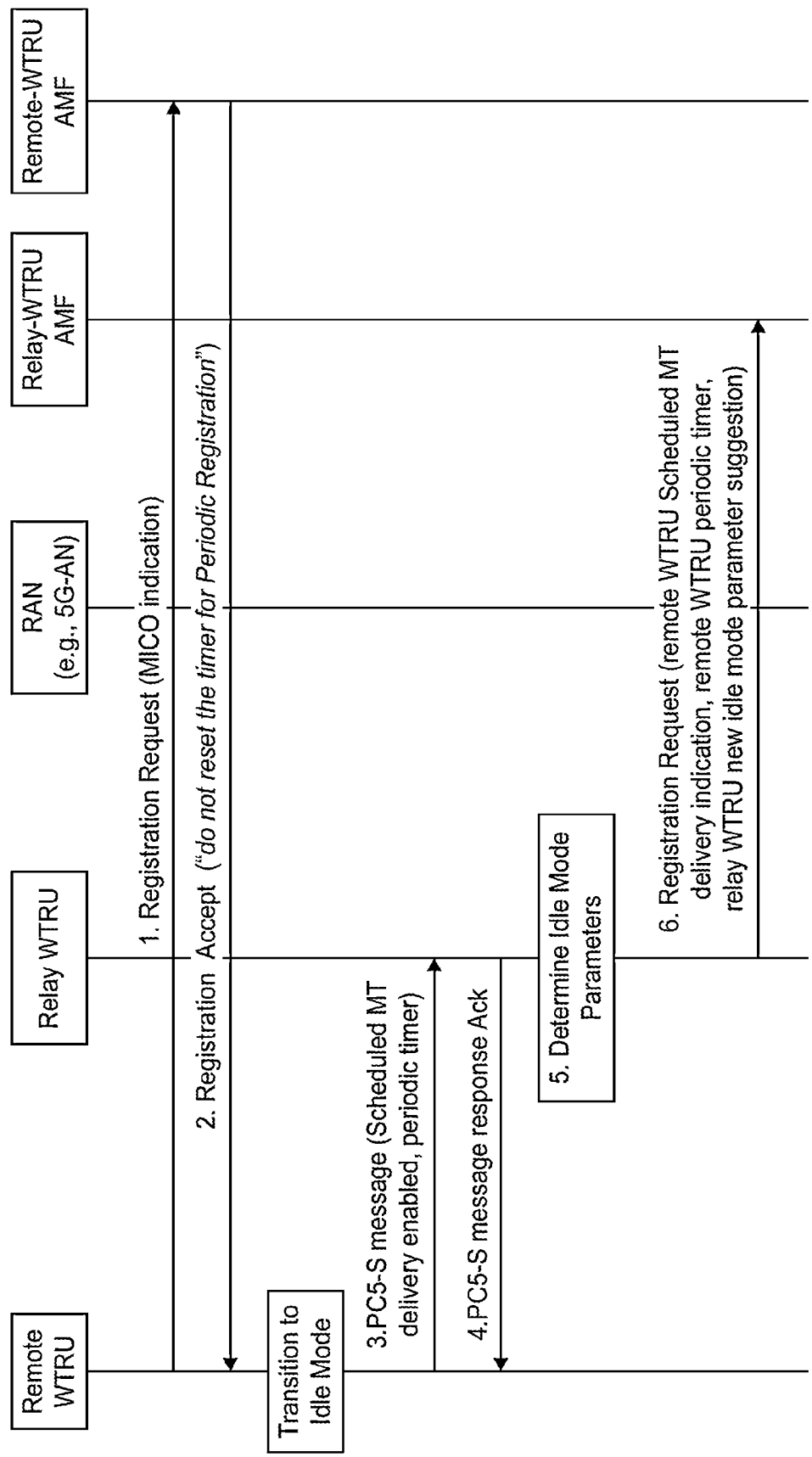
FIG. 7 is a message flow diagram illustrating a procedure for enabling scheduled mobile terminated (MT) data delivery for a remote WTRU.

FIG. 7 is a message flow diagram illustrating a procedure for enabling scheduled mobile terminated (MT) data delivery for a remote WTRU. For simplicity of exposition, the procedure for enabling scheduled MT data delivery for a remote WTRU is described using the communications system 100 of FIG. 2 (and in turn FIG. 1). The example procedure for enabling scheduled MT data delivery for a remote WTRU may be carried out in other communications systems, as well.

A remote WTRU may request MICO from the network (e.g., the remote-WTRU AMF) (1). The network may send a registration accept message to the remote WTRU (2). The registration accept message may include the "do not reset the timer for Periodic Registration". The remote WTRU may receive the registration accept message (2).

At state change to idle mode, the remote WTRU may inform the relay WTRU that the schedule MT feature is enabled (3). The remote WTRU, for example, may send a PC5 signaling message to the relay WTRU. The PC5 signaling message may include an indication that the schedule MT feature is enabled and/or a value of the periodic time.

The request may be acknowledged by the relay WTRU (4). The relay WTRU, for example, may sending a PC5 signaling response message.

Received parameters from the remote WTRU may be used by the relay WTRU to determine its idle mode behavior (e.g. enable/disable power saving) and corresponding parameters (e.g. requested active time, periodic timer etc.) (5).

The relay WTRU may send a registration message with a new indication of the remote WTRU enabling scheduled MT data delivery feature and possibly remote WTRU periodic timer in addition to the new idle mode parameters (6).

In various embodiments, when the L2 relay WTRU is in a mobility restrictions area, e.g., a forbidden area or non-allowed area, and the L2 relay WTRU receives a message from remote WTRU which triggers the L2 relay WTRU to send message to the network (e.g. service request), the L2 relay WTRU may include an indication that the message is exempted from restriction, e.g. due to triggered for remote WTRU. The AMF may accept the message (e.g. service request).

In various embodiments, the network may indicate whether the mobility restrictions area for the L2 relay WTRU may apply to message triggered by remote WTRU. For example, the network may provide a set of non-allowed areas for the L2 relay WTRU itself (e.g., areas in which the L2 relay WTRU may be restricting from sending a service request to network for the L2 relay-WTRU data or signaling) and a set of non-allowed area for the remote WTRU (e.g., areas in which the L2 relay WTRU may be restricted from sending a service request to network even it's triggered for data or signaling of the remote-WTRU).

Examples of the L2 relay-WTRU behaviors may include one or more of the following:
- the L2 relay-WTRU may receive mobility restrictions with indication whether applicable for message triggered by the remote WTRU;
- the L2 relay-WTRU may receive a message from remote WTRU and may decide to send a message to the network, e.g., service request; and
- the L2 relay-WTRU may include an indication in the message (e.g., service request) that the message is exempted from restriction, e.g., due to being triggered for data or signaling of the remote-WTRU.

Figure 8:
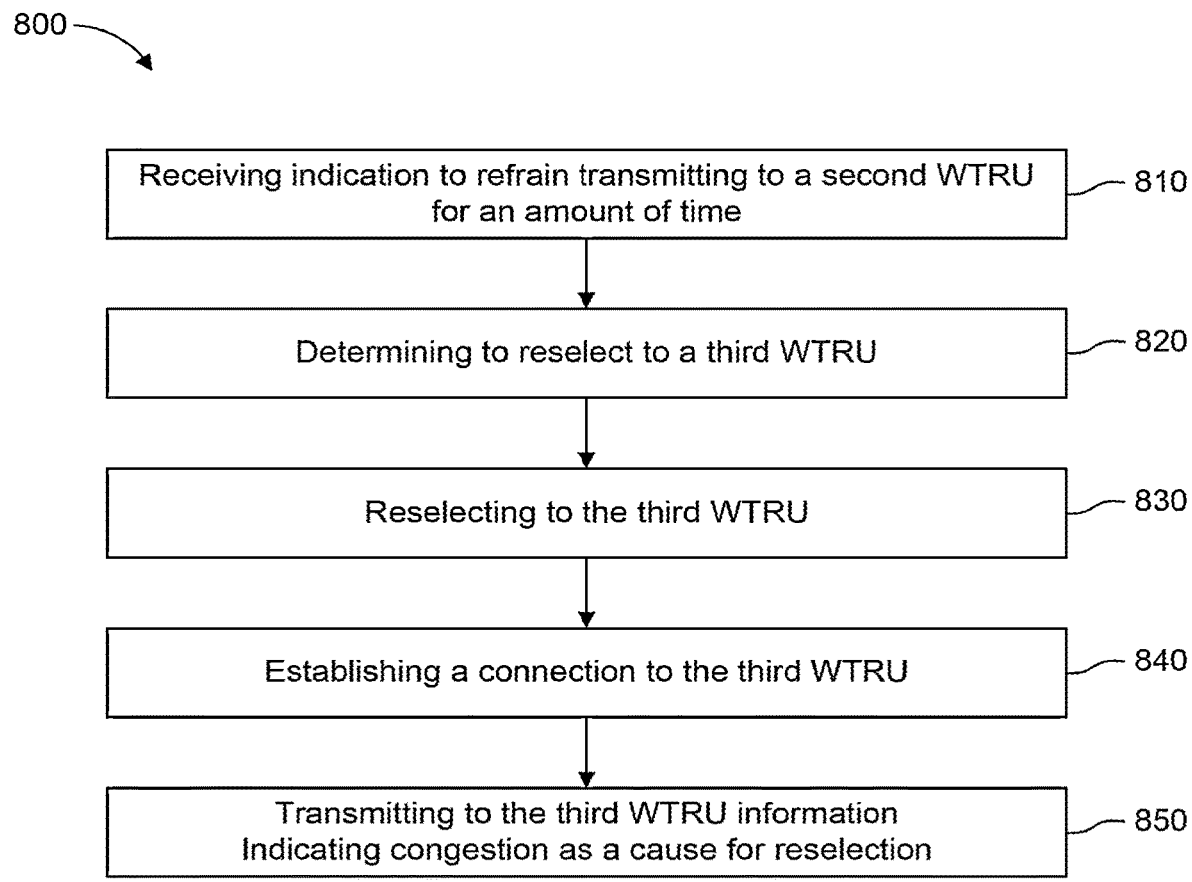
FIG. 8 is a flow chart illustrating an example of a method implemented in a WTRU according to an embodiment.

FIG. 8 is an example of a method 800 implemented in a first WTRU. The method may comprise the following steps. At step 810, the first WTRU may receive, from a second WTRU, via a first sidelink, a first information indicating an amount of time (e.g., a time period) for the first WTRU to refrain from transmitting to the second WTRU. As an example, the first WTRU may be refrain from transmitting to the second WTRU a second information, for termination to a network element, that may have to be relayed by the second WTRU. The first sidelink may include a first sidelink transmission comprising the first information. As a discovery process to discover another WTRU, at step 820, the first WTRU may determine to reselect to a third WTRU responsive to receiving the first information and based on a second sidelink transmission from the third WTRU. Reselecting to the third WTRU may comprise autonomous reselecting to the third WTRU. At step 830, the first WTRU may reselect to the third WTRU. The reselection may be processed on the second sidelink responsive to receiving the first information. At step 840, the first WTRU may establish a connection with the third WTRU. At step 850, the first WTRU may transmit to the third WTRU, a third sidelink transmission comprising a third information indicating congestion as a cause for the reselection.

The third sidelink transmission may addressed to, destined for, or terminated to the third WTRU. More particularly, the third sidelink transmission may comprise a first message addressed to, destined for, or terminated to a network element. The first message may comprise the third information indicating congestion as a cause for the reselection. The amount of time for the first WTRU to refrain from transmitting to the second WTRU may comprise a value for a back off timer. The network element may be associated with the first WTRU and/or with the third WTRU.

The method of FIG. 8 may further comprise a step of transmitting, to a network element via the third WTRU, a fourth sidelink transmission comprising a fourth information indicating congestion as a cause for the reselection, wherein the fourth sidelink transmission is destined for/terminated to the network element. The network element may comprise an access and mobility management function, AMF.

The third information may be included in a message to the third WTRU during discovery so that the third WTRU may use the third information to determine whether to allow the first WTRU to connect thereto.

Prior to performing discovery or prior to establishing the connection with the third WTRU, the method of FIG. 8 may further comprise a step of determining whether an identifier of the third WTRU is listed on a first list of identifiers of WTRUs that are available for relaying and/or determining whether an identifier of the third WTRU is not listed on a second list of identifiers of WTRUs that are unavailable for relaying.

The fourth sidelink transmission may comprise a second message comprising the third information, and wherein the second message is in a protocol according to a non-access stratum, NAS, protocol.

The first sidelink transmission may comprise a third message comprising the first information, and wherein the third message is in a protocol according to any of a NAS protocol and a radio resource control, RRC, protocol and a PC5 protocol. The third message may comprise any of a link release message and a PC5 message.

Figure 9:
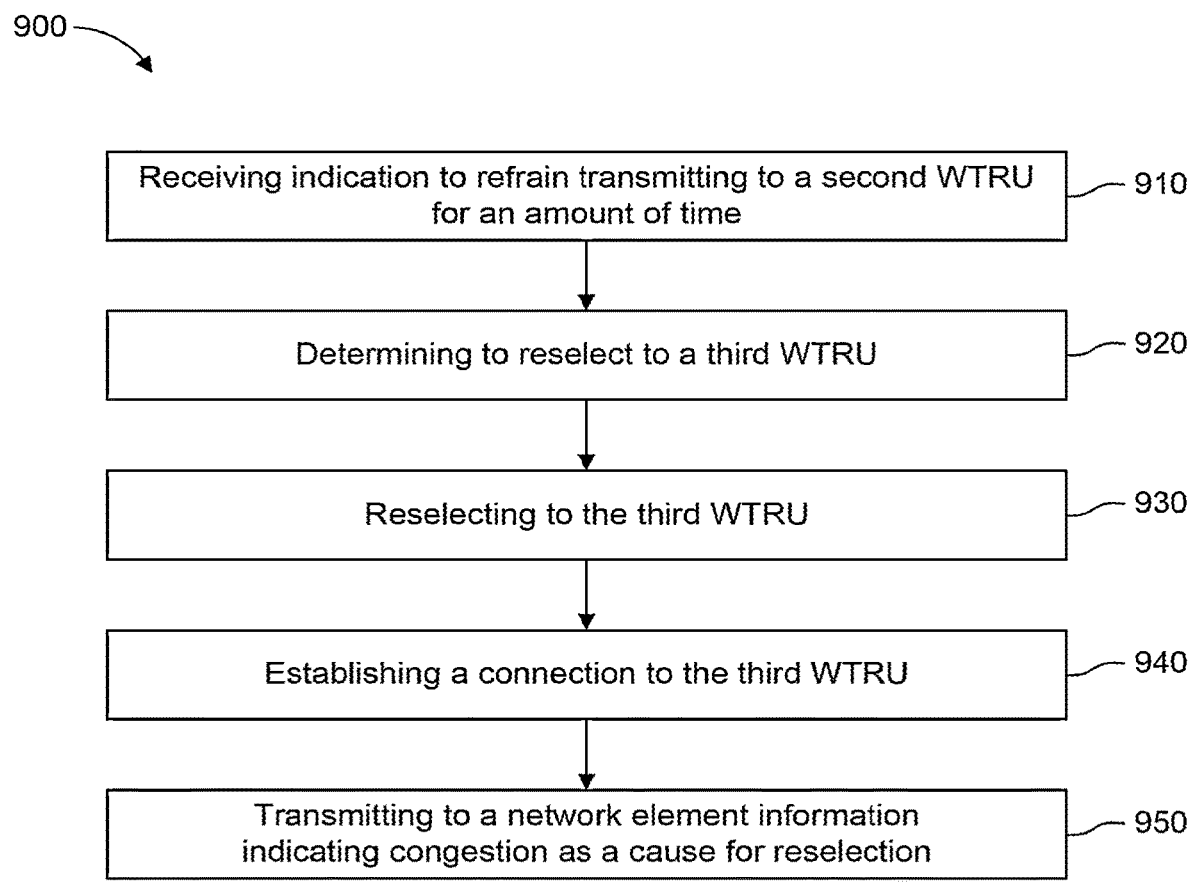
FIG. 9 is a flow chart illustrating an example of a method implemented in a WTRU according to another embodiment.

FIG. 9 is another example of a method 900 implemented in a first WTRU. The method may comprise the following steps. At step 910, the first WTRU may receive, from a second WTRU, a first sidelink transmission comprising a first information indicating an amount of time for the first WTRU to refrain from transmitting to the second WTRU. At step 920, the first WTRU may determine to reselect to a third WTRU responsive to receiving the first information and based on a second sidelink transmission from the third WTRU. At step 930, the first WTRU may reselect to the third WTRU. Reselecting to the third WTRU may comprise autonomous reselecting to the third WTRU. At step 940, the first WTRU may establish a connection with the third WTRU. At step 950, the first WTRU may transmit to a network element via the third WTRU, a third sidelink transmission comprising a second information indicating congestion as a cause for the reselection, wherein the third sidelink transmission is addressed to, destined for or terminated to the network element.

Figure 10:
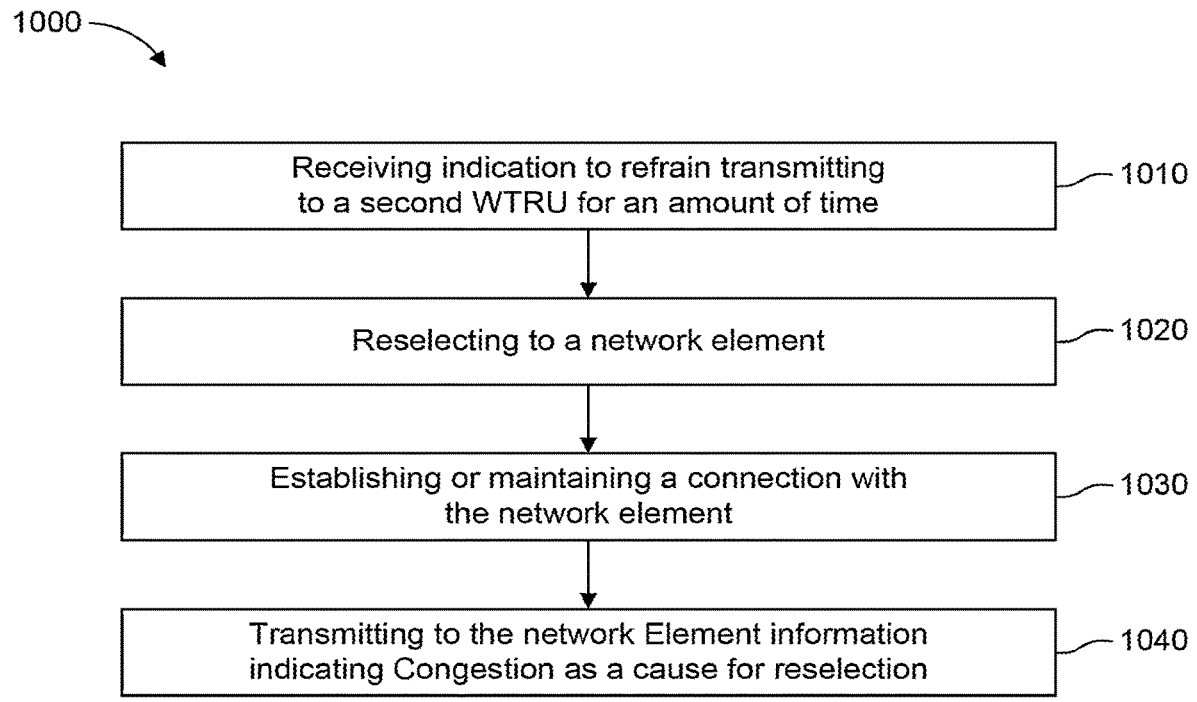
FIG. 10 is a flow chart illustrating an example of a method implemented in a WTRU according to another embodiment.

FIG. 10 is another example of a method 1000 implemented in a first WTRU. The method may comprise the following steps. At step 1010, the first WTRU may receive from a second WTRU, a first sidelink transmission comprising a first information indicating an amount of time for the first WTRU to refrain from transmitting to the second WTRU. At step 1020, the first WTRU may reselect to a network element responsive to receiving the first information. The reselection to the network element may comprise autonomous reselection to the network element At step 1030, the first WTRU may establish or maintain a connection with the network element. At step 1040, the first WTRU may transmit, to the network element, a second information indicating congestion as a cause for establishing the connection.

The network element may comprise an access and mobility management function, AMF. The AMF may be associated with the first WTRU.

Figure 11:
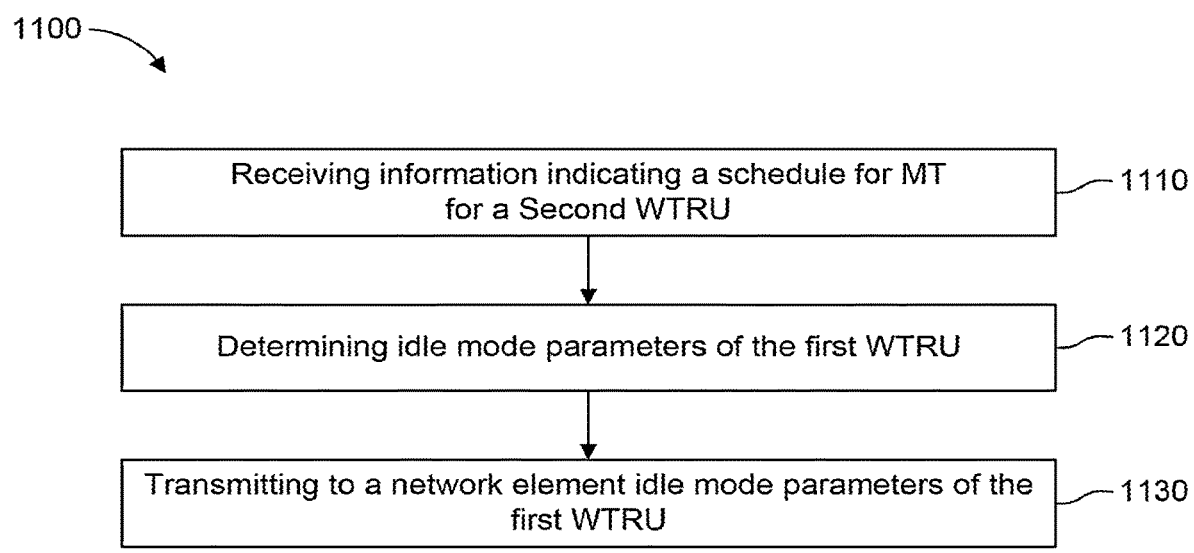
FIG. 11 is a flow chart illustrating an example of a method implemented in a WTRU according to another embodiment.

FIG. 11 is another example of a method 1100 implemented in a first WTRU. The method may comprise the following steps. At step 1110, the first WTRU may receive, from a second WTRU, a first sidelink transmission comprising, a first information indicating a schedule for mobile terminated (MT) data for the second WTRU. At step 1120, the first WTRU may determining idle mode parameters of the first WTRU based on the first information. At step 1130, the first WTRU may transmit to a network element associated with the first WTRU, a second information indicating idle mode parameters of the first WTRU.

A first message may comprise the first information, and the first information may indicate one or more parameters corresponding to scheduling MT data. The method of FIG. 11 may further comprise a step of transmitting, to a network element associated with the first WTRU, a third information indicating the second WTRU is enabled to receive MT data.

Figure 12:
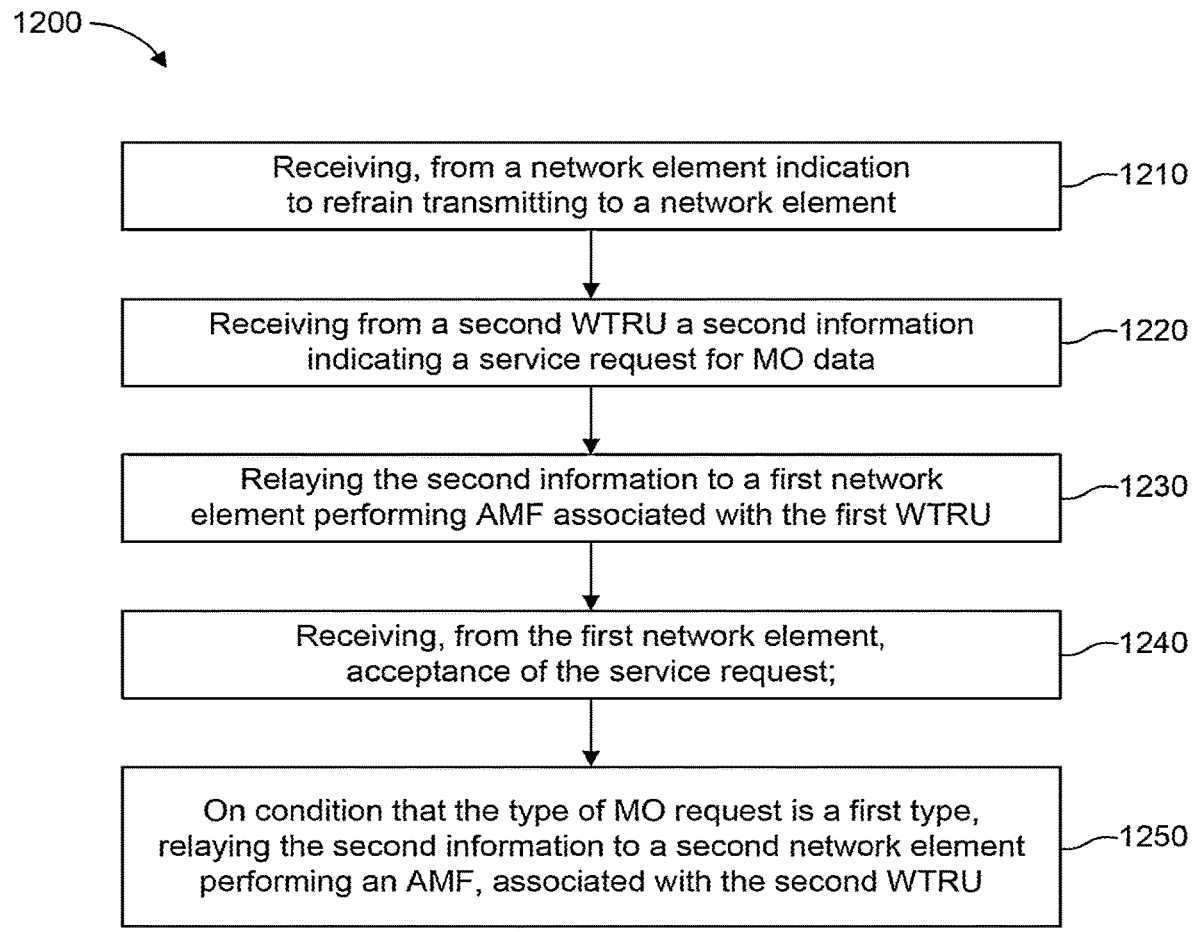
FIG. 12 is a flow chart illustrating an example of a method implemented in a WTRU according to another embodiment.

FIG. 12 is another example of a method 1200 implemented in a first WTRU. The method may comprise the following steps. At step 1210, the first WTRU may receive, from a network element, a first information indicating an amount of time for the first WTRU to refrain from transmitting to the network element. At step 1220, the first WTRU may receive from a second WTRU, a first sidelink transmission comprising a second information indicating a service request for mobile originated (MO) data. At step 1230, the first WTRU may relay the second information to a first network element performing an AMF. The first network element may be associated with the first WTRU. At step 1240, the first WTRU may receive from the first network element, a third information indicating acceptance of the service request. At step 1250, and on condition that the type of MO request is a first type, the first WTRU may relay the second information to a second network element performing an AMF. The second network element may be associated with the second WTRU.

According to various embodiments, a method implemented in a WTRU experiencing, expected to experience and/or informed of upstream congestion, may comprise the following steps: informing a remote WTRU of such congestion; and causing various actions to be taken at the remote WTRU to bar or otherwise limit UL and/or DL relaying operation.

According to various embodiments, a method implemented in a WTRU experiencing, expected to experience and/or informed of upstream congestion, may comprise the following steps: informing a remote WTRU of such congestion; and override congestion control mechanisms applied to the relay WTRU to allow UL and/or DL relaying operation.

The various actions may comprise causing the remote WTRU to refrain from communicating with the relay WTRU for a time period. The period may be based on a time during which the relay WTRU is experiencing and/or expected to experience congestion. The time period may be based on one or more signaled values. The time period may be set initially to one value and then adjusted up or down with another value, etc.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation.

Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A first wireless transmit/receive unit (WTRU) comprising circuitry, including a transmitter, a receiver, a processor and memory, configured to:
   receive, from a second WTRU, a first PC5 sidelink transmission comprising a first link release message, wherein the first link release message comprises a first backoff timer value and a cause value indicating congestion, and wherein the second WTRU is a first relay WTRU;
   release the connection with the second WTRU and initiate a backoff timer associated with the second WTRU based on the received first backoff timer value;
   determine to connect to a third WTRU based on a second PC5 sidelink transmission comprising a first discovery message from the third WTRU, wherein the third WTRU is a second relay WTRU;
   establish a PC5 sidelink connection to the third WTRU;
   receive, from the third WTRU, a third PC5 sidelink transmission comprising a second link release message;
   release the connection with the third WTRU;
   determine to connect to a fourth WTRU based on a fourth PC5 sidelink transmission comprising a second discovery message from the fourth WTRU; and
   on condition that the fourth WTRU is the same WTRU as the second WTRU, refrain from establishing a PC5 connection to the second WTRU on condition that the backoff timer associated with the second WTRU has not expired.

2. The first WTRU of claim 1, wherein the cause value indicates NAS level congestion.

3. The first WTRU of claim 1, wherein the cause value indicates an upstream congestion.

4. The first WTRU of claim 1, wherein the backoff timer is a PC5 backoff timer associated with the second WTRU.

5. The first WTRU of claim 1, wherein the back of timer value indicates a duration of time for which the relay WTRU may not be able to accept new PC5 requests.

6. The first WTRU of claim 1, wherein the back of timer value is a signaled value NAS back off timer.

7. The first WTRU of claim 1, configured to
   establish a PC5 connection to the second WTRU, on condition that the backoff timer associated with the second WTRU has expired.

8. The first WTRU of claim 1, configured to
   receive a fifth PC5 sidelink transmission comprising a second backoff timer value, wherein the second backoff timer value increases the backoff timer associated with the second WTRU to infinity.

9. A method, implemented in a first wireless transmit/receive unit (WTRU), comprising:
   receiving, from a second WTRU, a first PC5 sidelink transmission comprising a first link release message, wherein the first link release message comprises a first backoff timer value and a cause value indicating congestion, and wherein the second WTRU is a first relay WTRU;

releasing the connection with the second WTRU and initiate a backoff timer associated with the second WTRU based on the received first backoff timer value;

determining to connect to a third WTRU based on a second PC5 sidelink transmission comprising a first discovery message from the third WTRU, wherein the third WTRU is a second relay WTRU;

establishing a PC5 sidelink connection to the third WTRU;

receiving, from the third WTRU, a third PC5 sidelink transmission comprising a second link release message;

releasing the connection with the third WTRU;

determining to connect to a fourth WTRU based on a fourth PC5 sidelink transmission comprising a second discovery message from the fourth WTRU; and on condition that the fourth WTRU is the same WTRU as the second WTRU, refraining from establishing a PC5 connection to the second WTRU on condition that the backoff timer associated with the second WTRU has not expired.

10. The method of claim 9, wherein the cause value indicates NAS level congestion.

11. The method of claim 9, wherein the cause value indicates an upstream congestion.

12. The method of claim 9, wherein the backoff timer is a PC5 backoff timer associated with the second WTRU.

13. The method of claim 9, wherein the back of timer value indicates a duration of time for which the relay WTRU may not be able to accept new PC5 requests.

14. The method of claim 9, wherein the back of timer value is a a signaled value NAS back off timer.

15. The method of claim 9 comprising:
on condition that the backoff timer associated with the second WTRU has expired, establishing a PC5 connection to the second WTRU.

16. The method of claim 9 comprising:
receiving a fifth PC5 sidelink transmission comprising a second backoff timer value, wherein the second backoff timer value increases the backoff timer associated with the second WTRU to infinity.

\* \* \* \* \*